United States Patent [19]

Gallo et al.

[11] Patent Number: 4,625,566
[45] Date of Patent: Dec. 2, 1986

[54] MASS AND FORCE METER

[76] Inventors: Mario Gallo, Krönleinstr. 1, CH-8044 Zurich; Johannes Wirth, Sonnenbergstr. 55, CH-8032 Zurich, both of Switzerland

[21] Appl. No.: 710,096

[22] Filed: Mar. 11, 1985

[30] Foreign Application Priority Data

Mar. 31, 1984 [EP] European Pat. Off. ........ 84103601.5

[51] Int. Cl.$^4$ ............................ G01L 1/26; G01L 1/10
[52] U.S. Cl. ............................... 73/862.38; 73/862.59
[58] Field of Search ........... 73/862.38, 862.59, 862.68, 73/704, 517 AV, 432 A, DIG. 1; 177/210 FP

[56] References Cited

U.S. PATENT DOCUMENTS 3,423,999  1/1969  Wirth et al.
4,435,666  3/1984  Fukui et al. .................... 73/DIG. 1
4,479,391  10/1984  Banik et al. ..................... 73/862.59
4,526,247  7/1985  Eernisse et al. ............. 73/862.59 X

FOREIGN PATENT DOCUMENTS 2239997  10/1973  Fed. Rep. of Germany.
2857525  12/1980  Fed. Rep. of Germany.

Primary Examiner—Charles A. Ruehl
Attorney, Agent, or Firm—Parkhurst & Oliff

[57] ABSTRACT

Mass and force meter with a body, a load support guided parallely and vertically, a strokeless measuring system and a lever system for transmission of the load acting on the load support to the measuring system. The lever system consists at least partially of a single, flat plate a part of which is tightly connected to the body.

4 Claims, 19 Drawing Figures

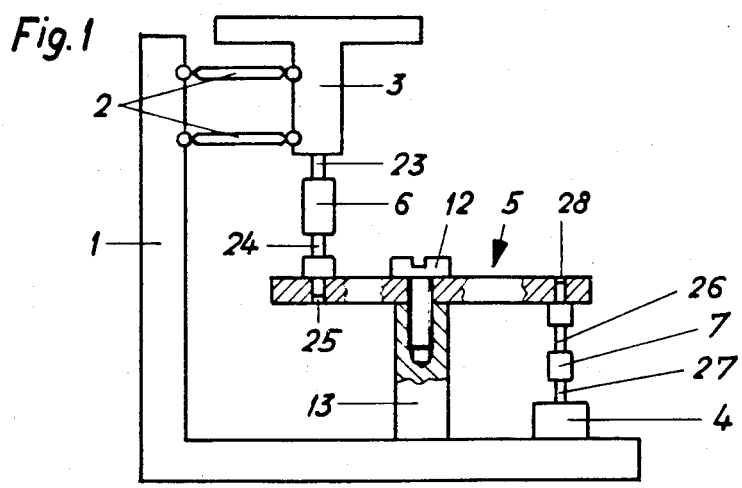
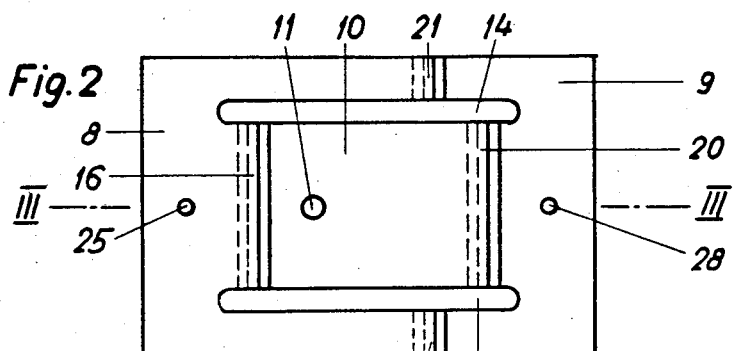
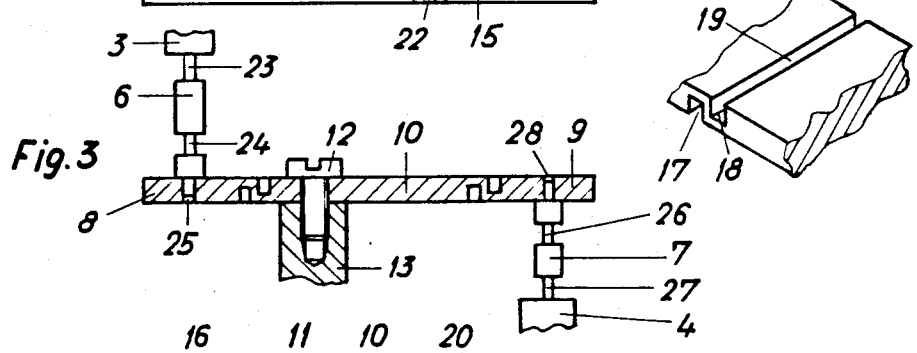
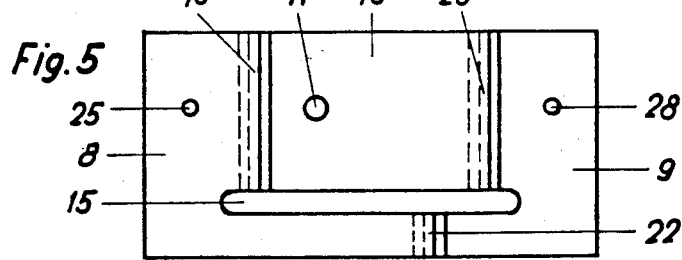

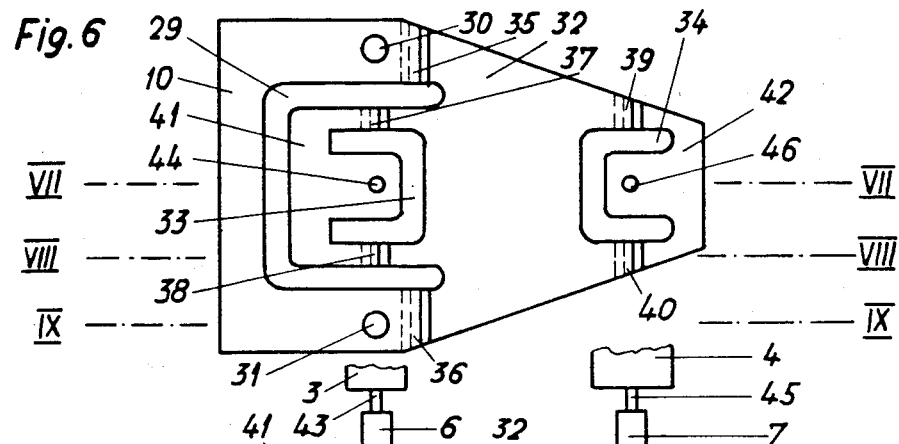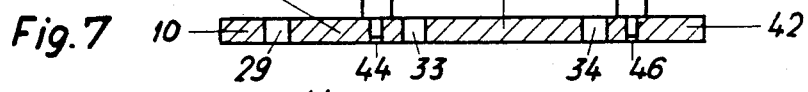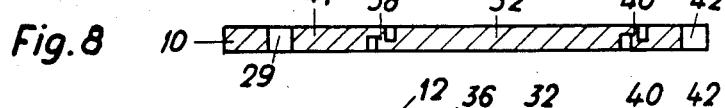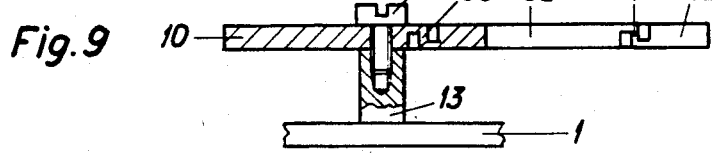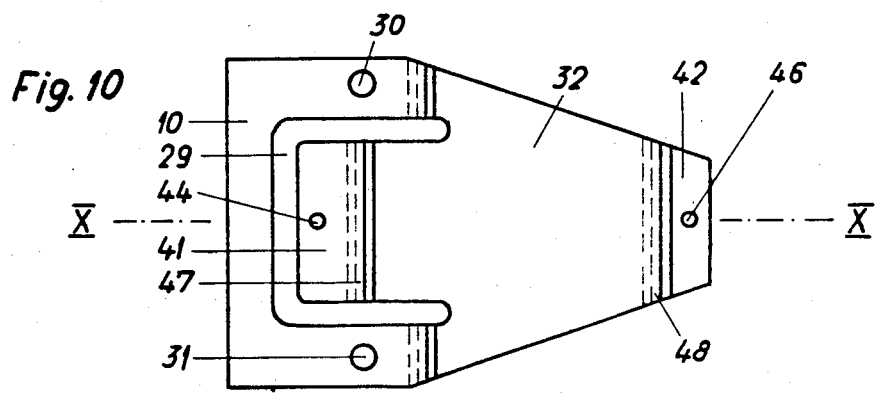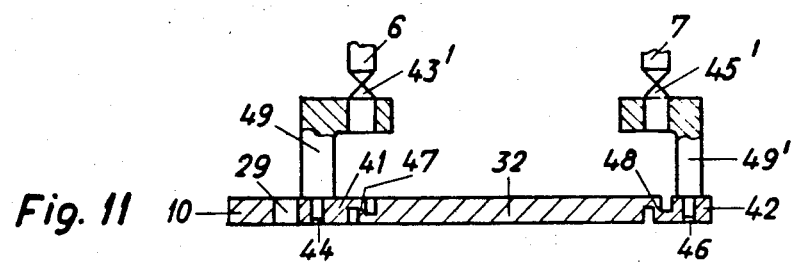

MASS AND FORCE METER

BACKGROUND AND SUMMARY OF THE INVENTION

The present invention concerns a mass and force meter with a body, a load support that is guided parallely and vertically, a strokeless measuring system and a lever system for transmission of the load acting on the load support to the measuring system.

Such meters, also called blocked scales, are known, for instance from U.S. Pat. No. 3,423,999. When the measuring system of such meters is separated from the meter the remaining parts form a kinematic system with one degree of freedom. A strokeless measuring system is a system in which all movements permitted by the system are virtual movements. Such measuring systems can consist for instance of at least one vibrating string or a strain gauge and the necessary electronic circuitry.

The lever system transmits the load to the measuring system, the load being generally multiplied or reduced by the lever system. The pans and knives of classical lever systems which allow for large rotational movements are replaced in blocked scales by cross articulations or flat band articulations or by resilient articulations. These articulations consist of several parts and it is extremely difficult to control their resetting force.

The reduction ratio with which the load is transmitted cannot be chosen arbitrarily small, so that the absolute value of the length of the smallest lever cannot be made as small as could be desirable.

It is an object of the present invention to provide a mass and force meter in which the lever system is able to transmit the load to be measured with high precision and at the same time with any desired multiplication or reduction ratio without unacceptable economic burden.

It is another object of the invention to provide a lever system consisting at least partly of a single, flat plate having one of its parts tightly connected to the body of the meter.

BRIEF DESCRIPTION OF THE DRAWINGS

Embodiments of the object of the invention are shown schematically in the enclosed drawings in which:
FIG. 1 shows a first embodiment,
FIG. 2 shows the lever system of the meter of FIG. 1,
FIG. 3 shows a cross-section along line III—III in FIG. 2,
FIG. 4 shows a flat band articulation,
FIG. 5 shows a variant to FIG. 2,
FIG. 6 shows another variant to FIG. 2,
FIG. 7 shows a cross-section along the line VII—VII in FIG. 5,
FIG. 8 shows a cross-section along the line VIII—VIII in FIG. 5,
FIG. 9 shows a cross-section along the line IX—IX in FIG. 5,
FIG. 10 shows a variant to FIG. 6,
FIG. 11 shows a cross-section along the line XI—XI in FIG. 10,
FIG. 12 shows another variant to FIG. 2,
FIG. 13 shows a second embodiment,
FIG. 14 shows a part of the lever system of FIG. 13,
FIG. 15 shows a detail of FIG. 14.

DETAILED DESCRIPTION OF THE PREFERRED EMBODIMENTS

Figure 16:
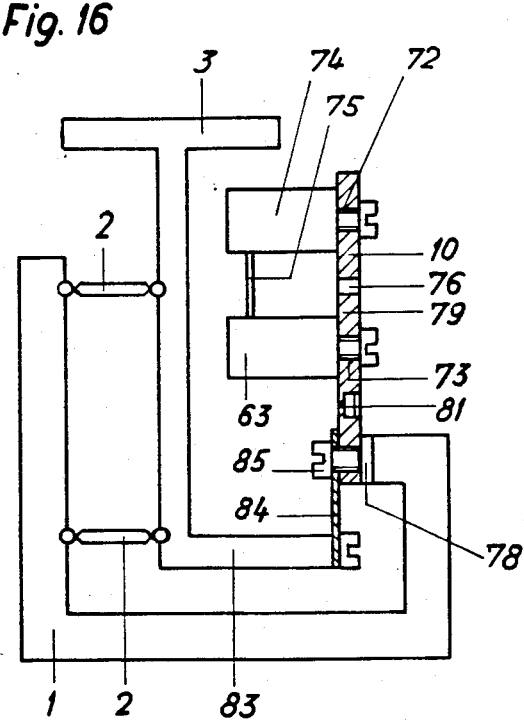
FIG. 16 shows a third embodiment.
Figure 17:
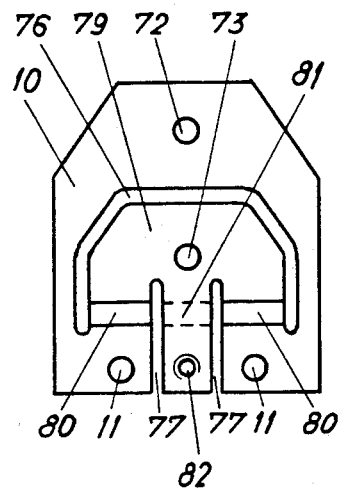
FIG. 17 shows the lever system of FIG. 15.
Figure 18:
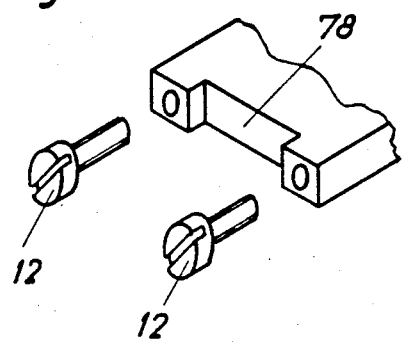
FIG. 18 shows a construction detail.

FIGS. 1-4 show schematically a first embodiment. The meter consists of a body 1, a load support 3 guided parallely and vertically by guides 2, a measuring system 4 fixed to body 1 and a lever system 5. The measuring system 4 can for instance consist of a transducer with vibrating strings. The load to be measured is transmitted from load support 3 to lever system 5 by means of a rod 6 and from lever system 5 to measuring system 4 by means of a second rod 7. Lever system 5 consists of a rigid plate for instance an aluminium plate providing two levers 8, 9 and a part 10. The sides of part 10 are defined by two slits 14, 15. Part 10 has a hole 11 and is tightly fixed to a socket 13 of body 1 by means of a screw 12 (FIG. 1). The first lever 8 is linked to part 10 by means of a flat band articulation 16 allowing a pivotal movement of this lever 8. FIG. 4 shows how this flat band articulation is manufactured. It consists of a groove 17 milled on the lower side of the plate and of a groove 18 milled on the upper side of the plate. These grooves 17, 18 are offset so that a thin, resilient, flat band 19 remains between them. The second lever 9 is fixed to part 10 by means of a flat band articulation 20 running parallel to flat band articulation 16. Both levers 8, 9 are linked to each other by means of a pair of flat band articulations 21, 22.

Rod 6 presents two thinner parts 23, 24, it is fitted at one end in load support 3 and at the other end in a hole 25 of lever 8. Rod 7 also presents two thinner parts 26, 27, it is fitted at one end in a hole 28 of lever 9, its other end acts upon the force input of measuring system 4. All input and output forces acting on, and from, the lever system are thereby vertically directed as they have to pass the thinner parts 23, 24 and 26, 27. As a consequence all forces acting on flat band articulations 16, 20 and 21, 22 are also vertical forces.

FIG. 5 is a variant to FIG. 2 with only one slit 15. Flat band articulations 16 and 20 run up to the upper edge of the plate (as seen in FIG. 5). Levers 8 and 9 are linked to each other by flat band articulation 22 only.

FIGS. 6 to 9 show a variant of lever system 5 in which it consists of one lever only. Part 10 which is tightly fixed to body 1 is defined by one C-shaped slit 29. It has two holes 30, 31 so that it can be fixed to socket 13 of body 1 by means of two screws 12. The unique lever 32 has also two C-shaped slits 33, 34 and is fixed to part 10 by means of two flat band articulations 35, 36 allowing pivotal movements of lever 32. Furthermore, lever 32 has two pairs of flat band articulations 37, 38 and 39, 40 so that an input end part 41 and an output end part 42 are formed which are pivotally linked to lever 32. Rod 6 has a coaxial thinner part 43, its lower end is fitted in a hole 44 of end part 41. Hole 44 and flat band articulation pair 37, 38 are so placed with respect to each other that the axis of this pair of flat band articulations 37, 38 and that of rod 6 intersect and are orthogonal to each other. Rod 7 has also a single thinner, coaxial part 45. Its lower end is fitted in a hole 46 of end part 42. Also here the axes of rod 7 and that of the pair of flat band articulations 39, 40 intersect and are orthogonal to each other. In this variant measuring system 4 is mounted in body 1 above lever system 5.

FIGS. 10, 11 show a variant of FIG. 6. Instead of pairs of flat band articulations 37, 38 and 39, 40 single flat band articulations 47 and 48 link end parts 41 and 42 to lever 32. The axes of holes 44, 46 do not anymore intersect with the axes of the pairs of flat band articulations as explained above. In this case the rotational movements of rods 6 and 7 are no more symmetrical. These rods 6, 7 must therefore have an L-shaped arm 49 and 49', respectively, which are fitted in holes 44 and 46, respectively, so that the thinner parts 43, 45 can be replaced by cross articulations 43', 45' which are mounted exactly above flat band articulations 47, 48 respectively. Thanks to this disposition all forces transmitted remain vertically oriented.

Figures 12, 13, 14, 15:
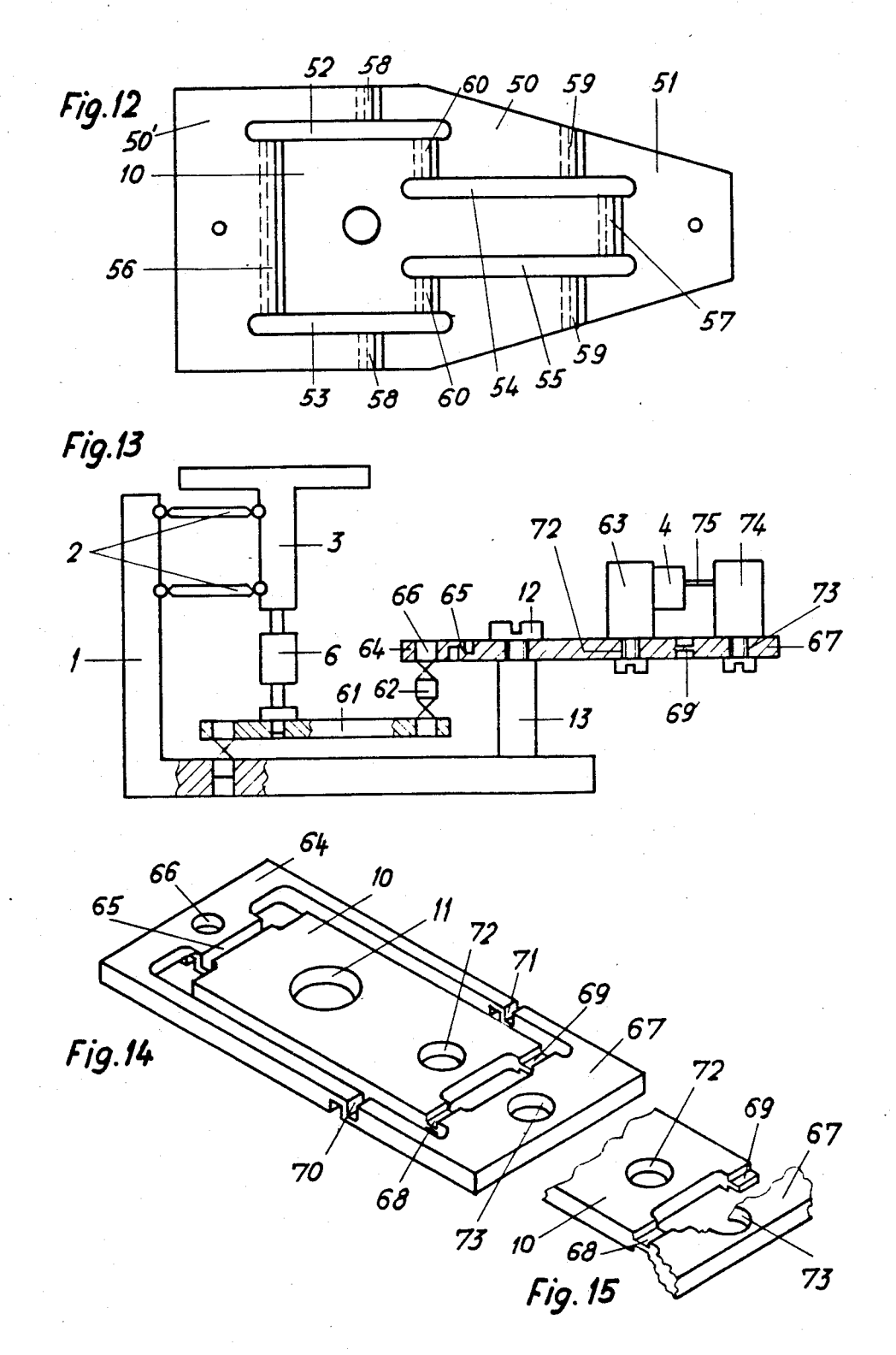

FIG. 12 shows a further variant in which lever system 5 comprises three levers 50', 50 and 51 which are separated from part 10 by means of pairs of longitudinal slits 52, 53 and 54, 55. Levers 50' and 51 are linked to part 10 by means of flat band articulations 56 and 57, respectively. Lever 50 is linked to part 10 by means of a pair of flat band articulations 60 and to levers 50' and 51 by means of flat band articulations 58 and 59, respectively.

In FIGS. 13-15 a further embodiment of the meter is represented schematically, in which only a part of the lever system is formed by a single plate. Rod 6 acts upon a first lever 61 which is pivotally mounted in body 1. This lever 61 is linked by means of a traction element 62 with the other levers which, together with part 10, form a single plate. Measuring system 4 is fixed to a socket 63 which in turn is fixed to part 10 mounted on socket 13 of body 1 by means of screw 12. FIGS. 14, 15 show plate 10 and the levers forming together a single plate. The first lever 64 is linked to part 10 by means of a flat band articulation 65. It has a hole 66 in which the end of traction element 62 is fixed (not shown in FIG. 14). The second lever 67 is linked to part 10 by means of a horizontal flat band articulation pair 68, 69 (FIG. 15). Both levers 64, 67 are linked to each other by means of a flat band articulation pair 70, 71. Part 10 has a second hole 72 in which socket 63 is fixed. Lever 67 has a hole 73 in which a second socket 74 is fixed. The load to be measured is transmitted from load support 3 by means of rod 6, lever 61, traction element 62, lever 64, flat band articulation pair 70, 71 to lever 67. Socket 74 is linked to the input of measuring system 4 by means of a traction wire 75 through which the load is transmitted to measuring system 4 with the desired reduction or amplification ratio.

In this embodiment measuring system 4 could also consist of both parts designated by reference numbers 63 and 74. In this case traction wire 75 would also be a part of this measuring system, for instance a vibrating string or a strain gauge.

Figure 19:
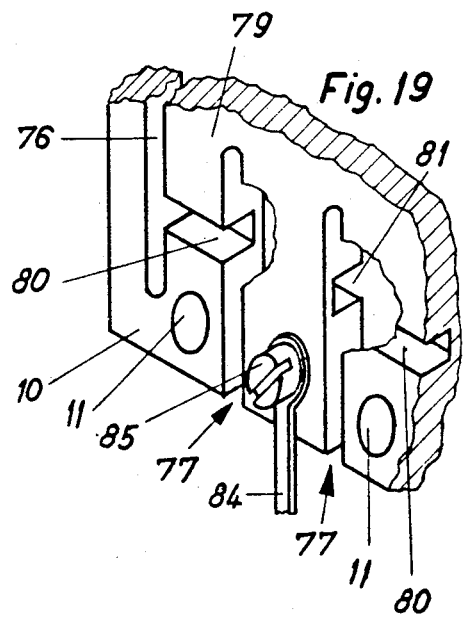
FIG. 19 shows another construction detail.

A third embodiment is shown in FIGS. 16-19 in which the plate providing the lever system is mounted vertically. Part 10 fixed to body 1 is limited by a C-shaped slit 76 and two longer slits 77. It has two holes 11 so that it can be fixed by means of screws 12 to a C-shaped arm 78 of body 1. The single lever 79 is linked pivotally to part 10 by means of flat band articulations formed by two front grooves 80 (as seen in FIG. 19). A groove 81 milled on the back side links an end part to lever 79. This end part has a hole 82. Load support 3 has a horizontal arm 83 the end of which is linked with the end part of lever 79 by means of a traction band 84. The upper end of this traction band 84 is fixed by means of a screw 85 in hole 82. The load to be measured acts directly upon lever 79. The force acting vertically on the end part of lever 79 is transmitted with a reduction ratio by this lever 79 to traction wire 75.

The flat band articulations described, for instance flat band articulation 65 and flat band articulation pair 69 could be mounted horizontally instead of vertically. By combining horizontally and vertically mounted flat band articulations it is also possible to form cross articulations along an axis of pivotal movement of a lever.

We claim:

1. A mass and force meter comprising, a body, a load support, guides guiding said load support parallely and vertically with respect to said body, a strokeless measuring system, a lever system transmitting the load to be measured to said measuring system, said lever system including a single lever, first flat band articulations linking said single lever to a flat part tightly fixed to said body, said single lever and said flat part forming a single, flat plate, a first slit in said flat plate separating said single lever from said flat part, a second slit in said single lever separating it from an input end part, second flat band articulations linking said input end part to said single lever, a third slit in said single lever separating it from an output end part, third flat band articulations linking said output end part to said single lever.

2. A mass and force meter comprising, a body, a load support, guides guiding said load support parallely and vertically with respect to said body, a strokeless measuring system, a lever system transmitting the load to be measured to said measuring system, said lever system including a single lever, first flat band articulations linking said single lever to a flat part tightly fixed to said body, said single lever and said flat part forming a single, flat plate, a first slit in said flat plate separating said single lever from said flat part, a second slit in said single lever separating it from an input end part, second flat band articulations linking said input end part to said single lever, a third slit in said single lever separating it from an output end part, third flat band articulations linking said output end part to said single lever, a first rod with a thinner part connecting said load support with said input end part, a second rod with a thinner part connecting said output end part with said measuring system, the axis of said first rod intersecting the axis of said second flat band articulation and being orthogonal to it, the axis of said second rod intersecting the axis of said third flat band articulation and being orthogonal to it.

3. A mass and force meter comprising, a body, a load support, guides guiding said load support parallely and vertically with respect to said body, a strokeless measuring system, a lever system transmitting the load to be measured to said measuring system, said lever system consisting of a first, a second and a third lever forming a single flat plate, said plate having a part tightly fixed to said body, a first flat band articulation linking said first lever to said part, a second flat band articulation linking said second lever to said part, a third flat band articulation linking said third lever to said part, a fourth flat band articulation linking said first lever to said second lever, a fifth flat band articulation linking said second lever to said third lever.

4. A mass and force meter comprising, a body, a load support, guides guiding said load support parallely and vertically with respect to said body, a strokeless measuring system, a lever system transmitting the load to be measured to said measuring system, said lever system comprising a first lever pivotally mounted in said body and a second and a third lever forming a single flat plate, said plate having a part tightly fixed to said body, said measuring system being fixed to said part, a first flat band articulation linking said second lever with said part, a second flat band articulation linking said third lever with said part, a third flat band articulation linking said second lever with said third lever, said load support acting directly on said first lever, a first traction element connecting said first lever with said second lever, a second traction element connecting said third lever with said measuring system.

* * * * *